United States Patent [19]

Shinoda et al.

[11] Patent Number: 4,821,056
[45] Date of Patent: Apr. 11, 1989

[54] SHUTTER SPEED DISPLAY DEVICE FOR A CAMERA

[75] Inventors: Masaharu Kawamura, Kanagawa; Nobuaki Sakurada, Kanagawa; Hiroyasu Murakami, Tokyo; Nobuhiko Shinoda, Tokyo; Tadashi Ito, Kanagawa all of Japan

[73] Assignee: Canon Kabushiki Kaisha, Tokyo, Japan

[21] Appl. No.: 141,490

[22] Filed: Apr. 18, 1980

Related U.S. Application Data

[63] Continuation of Ser. No. 880,357, Feb. 23, 1978, abandoned.

[30] Foreign Application Priority Data

Mar. 8, 1977 [JP] Japan .................................. 52-25223

[51] Int. Cl.$^4$ ............................................. G03B 17/18
[52] U.S. Cl. ................................ 354/289.1; 354/471
[58] Field of Search .................... 354/23 D, 53, 60 L, 354/289; 340/336, 378.2, 715, 756, 766, 765, 804, 762; 368/241, 242; 356/226, 227

[56] References Cited

U.S. PATENT DOCUMENTS

| | | | |
|---|---|---|---|
| 3,982,254 | 9/1976 | Ito et al. | 354/53 |
| 4,032,933 | 6/1977 | Ito et al. | 354/23 D |
| 4,067,185 | 1/1978 | Hubuenin | 368/242 X |
| 4,134,654 | 1/1979 | Murakami et al. | 354/23 D X |

Primary Examiner—William B. Perkey
Attorney, Agent, or Firm—Toren, McGeady & Associates

[57] ABSTRACT

A digital display system connected to an exposure indicator in a camera to provide a digital display representative of the exposure value in shutter speed by an array of numerical indicators of the block number eight type. When the numerical value of shutter speed is equal to or larger than one second, the indicator which is directly to the right of the least significant digit is utilized to display an indicium representing a "second" unit as is usual in digital stop watch art by driving a pair of upper-positioned parallel segments in the "FIG. eight" pattern to be lit serially from the least significant digit.

3 Claims, 2 Drawing Sheets

| Tv | BINARY CODE | | | | DECODER OUTPUT | SHUTTER TIME VALUE |
|---|---|---|---|---|---|---|
| | D | C | B | A | | |
| -4 | 0 | 0 | 0 | 0 | 0 | 15 SECOND |
| -3 | 0 | 0 | 0 | 1 | 1 | 8 SECOND |
| -2 | 0 | 0 | 1 | 0 | 2 | 4 SECOND |
| -1 | 0 | 0 | 1 | 1 | 3 | 2 SECOND |
| 0 | 0 | 1 | 0 | 0 | 4 | 1 SECOND |
| 1 | 0 | 1 | 0 | 1 | 5 | 1/2 SECOND |
| 2 | 0 | 1 | 1 | 0 | 6 | 1/4 SECOND |
| 3 | 0 | 1 | 1 | 1 | 7 | 1/8 SECOND |
| 4 | 1 | 0 | 0 | 0 | 8 | 1/15 SECOND |
| 5 | 1 | 0 | 0 | 1 | 9 | 1/30 SECOND |

SHUTTER SPEED DISPLAY DEVICE FOR A CAMERA

This is a continuation of application Ser. No. 880,357, filed Feb. 23, 1978, now abandoned.

BACKGROUND OF THE INVENTION

1. Field of the Invention:

This invention relates to exposure value display systems for cameras, and, more particularly, to a digital display system for displaying the shutter speed by use of an array of numerical indicators. Still more particularly, it relates to a circuit for controlling the representation of a number with or without selection of a generally accepted time second sign mark which is formed by one of the numerical indicators.

2. Description of the Prior Art:

Use of numerical indicating tubes for generation of the rectilinear "Figure eight" pattern conformed by seven or eight segments is well known in displaying the output signal of an exposure meter in a photographic camera. With the exposure value representative of a shutter speed value, however, because of the display of a fraction of a shutter speed unit, that is, parts of a second, in integer form, it is required to discriminate upon which scale the displayed number is based. This is done either by employing ad added indicating tube adapted only for indicating a symbol such as 1/, as for example, disclosed in DOLS 2,364,851, which appears just to the left of the most significant digit when the numerical value of shutter speed is smaller than indicating tube second, or by utilizing the one (of the plurality numerical indicating tubes) which comes to appear just to the right of the least significant digit in displaying a fraction bar for that discriminating symbol as the central segment is driven alone for energization. For example, the display of a number eight is discriminated as $\frac{1}{8}$ and 8— in the former and latter cases respectively when this number happens to mean a reciporocal of 8 seconds. These symbols are however not generally accepted to mean the time unit as in the electrical clock art. For this reason, the beginner in photography often mistakes the displayed number as to whether or not it is longer than one second. Another disadvantage of the conventional digital display employing the symbol indicating tube is to increase the production cost and to decrease the design flexibility.

SUMMARY OF THE INVENTION

An object of the present invention is to provide a digital display system for use in connection with an exposure meter for cameras.

Another object of the invention is to provide a digital display system adapted to display a numerical value of shutter speed with or without selection of a time second unit symbol, that is, ", depending on whether or not the shutter speed is equal to or longer than one second, while nevertheless necessitating no particular readout element therefor in addition to numerical indicating elements forming a total readout device.

To achieve this, as any number is stylized by conforming to the seven segments of a Figure Eight pattern, when the shutter speed to be displayed is equal to or longer than one second, that is, 1", a pair of upper-positioned parallel side segments in the numerical indicating element which is directly to the right of the least significant digit of the number are selected to be driven for energization serially from the least significant digit.

The above and other objects, features and advantages of the present invention will become more apparent from the following description of the embodiment thereof taken in conjunction with the accompanying drawings.

DESCRIPTION OF THE PREFERRED EMBODIMENT

Figure 1:
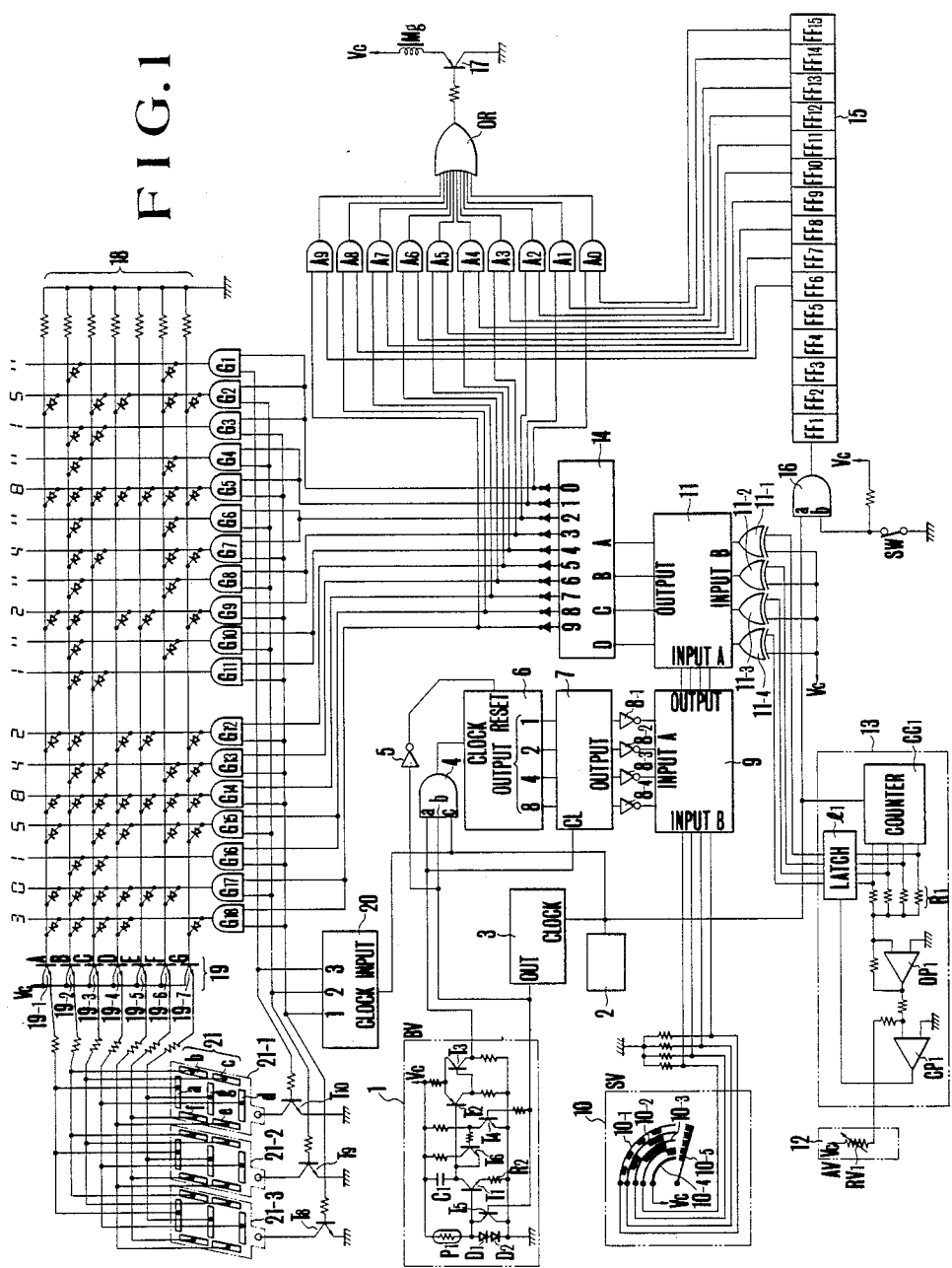
FIG. 1 is a schematic electrical circuit diagram, partly in block form, of one embodiment of a digital display system according to the present invention adapted for use in connection with a digital exposure value computer having an output signal representative of shutter speed.

FIG. 1 shows one embodiment of the present invention, in accordance with which a digital display system is provided for connection to the output of an automatic exposure control system. The exposure control system includes a light measuring circuit 1 periodically operating at a rate controlled by a frequency divider 3 to produce an analogue signal which is converted to a digital signal by components 2 to 6. The light measuring circuit 1 comprises a phot-sensitive element $P_1$, such as a cadmium sulfide CdS, a string of diodes $D_1$ and $D_2$ connected in series to the photo-sensitive element $P_1$, a capacitor $C_1$ connected between a positive bus and a collector of a first transistor $T_1$, the latter having a base connected to a point of connection between the element $P_1$ and the diode $D_1$ and having an emitter connected to the circuit earth, a second transistor $T_2$ with a base connected to a point of connection between the capacitor $C_1$ and the first transistor $T_1$, a third transistor $T_3$ with an emitter and a base connected to an emitter and a collector of the second transistor $T_2$ respectively, a fourth transistor $T_4$ with a base connected to the output of the frequency divider 3, a fifth transistor $T_5$ with an emitter and a collector connected across the diode string and with a base connected to the output of the frequency divider 3, and a sixth transistor $T_6$ with a collector and an emitter connected across the capacitor $C_1$ and with a base connected to the collector of the fourth transistor $T_4$.

Figures 2, 3:
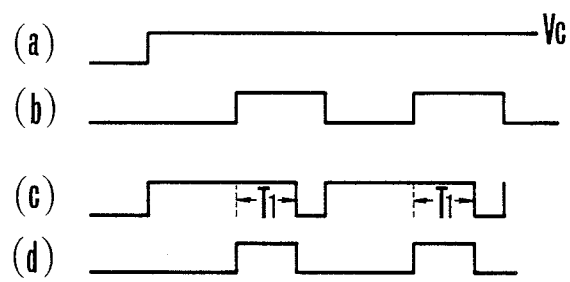
FIG. 2 comprises typical pulse waveforms illustrating the operation of the digital exposure meter of FIG. 1.
FIG. 3 is a table showing relationship between a binary coded input dependent upon the output signal of the computer and an equivalent decimal number output by which a numerical value of shutter speed is displayed in second.

When a "not shown" power switch is closed, a constant voltage Vc appears at the various components of the system as shown on line (a) in FIG. 2, causing a clock pulse generator 2 to start production of a clock pulse train which is applied, first of all, to the "clock" input of frequency divider 3. For frequency divider 3, use may be made of a counter sold under the trade name of SN 7493 from Texas Instruments Inc. (hereinafter abbreviated as TI Inc.). The waveform of output pulses of frequency divider 3 is shown on line (b) in FIG. 2. Upon occurrence of the leading edge of a first pulse on the bases of transistors $T_4$ and $T_5$, non-conducting of transistor $T_5$ is effected so that there appears across the diode string $D_1$ and $D_2$ a voltage proportional to the logarithm of an object brightness level (hereinafter referred to as Bv) sensed by photo-sensitive element $P_1$ to control the conductivity of first transistor $T_1$, while transistor $T_4$ is rendered conducting which in turn causes non-conducting of transistor $T_6$ to terminate duration of the short-circuit of capacitor $C_1$. Since the intensity of current flowing through the collector of transistor $T_1$ is controlled in accordance with Bv by the potential at the base thereof, capacitor $C_1$ is charged to what is termed the threshold level for the second transistor $T_2$ during a time interval which is varied as a function of Ev. With the maximum possible exposure time in the camera shutter, it is previously adjusted so that this time interval does not exceed the length of duration of each pulse from frequency divider 3. When the threshold level has been attained, transistor $T_2$ is turned on, and therefore transistor $T_3$ is turned off with the resultant output of the light measuring circuit 1 being taken at the trailing edge of the first pulse as shown on line (c) in FIG. 2. Such pulsing procedure of the light measuring circuit 1 is repeated to start each time when the trailing edge of the preceding pulse occurs from frequency divider 3.

To convert this analogue output signal of light measuring circuit 1 to a digital signal, there is provided an AND gate 4 connected at two of its three inputs, a, b and c, to the outputs of light measuring circuit 1 and frequency divider 3 to extract a component representation of the aforesaid time interval $T_1$ during which a corresponding number of clock pulses are allowed to pass through the AND gate 4 at the other input, c, to a "clock" input of a 4-bit binary counter 6 such as SN 7493. The counter 6 has four output stages which are weighted 1, 2, 4 and 8 respectively and connected to a latch circuit 7. The latch circuit 7 is composed of a 4-bit parallel-in parallel-out shift register such as SN 74178 available from TI Inc. At a time when the trailing edge of each output pulse of light measuring circuit 1 appears at a "clock" input of latch circuit 7, the number of clock pulses so far counted by the counter 6 is latched by and stored in latch circuit 7. This trailing edge is followed soon after by that of the concurrent pulse of frequency divider 3 which, after has been inverted to a signal of binary "1" level by an inverter 5, is applied to a "reset" input of counter 6.

A film speed setting device enclosed in a dashed line block 10 is constructed with four concentric arcuate tracks 10-1 to 10-4 of a binary coded decimal conduction pattern and a movable slider 10-5 pivoted at the common center of the curves of tracks 10-1 to 10-4 and arranged upon manual setting of a "not shown" dial to produce a 4-bit digital signal representative of the set value of film speed, Sv, in ASA. This ASA sensitivity information Sv is combined with the brightness information Bv by a 4-bit full adder such as SN 7483 available from TI Inc. to produce a digital output signal Ev based on the formula $Ev=Bv+Sv$, as the four output stages of latch circuit 7 are connected through respective inverters 8-1 to 8-4 to respective inputs A's of adder 9, while the four output stages of block Sv are connected to respective inputs Bs of adder 9.

A diaphragm value setting device 12 includes a variable resistor $RV_1$ cooperative with a diaphragm ring "not shown" for producing an analogue output signal representative of a desired diaphragm value and which is converted to a digital signal by an analogue-to-digital converter 13. Converter 13 includes a counter $CC_1$ receptive of the clock pulse train from block 2 and responsive to the number of pulses counted for determining the resistivity of a ladder circuit $R_1$ which comprises four resistors of different weight. Responsive to the ladder circuit $R_1$, an operational amplifier device $OP_1$ produces an analogue output which is compared with the output of variable resistor $RV_1$ by a comparator $CP_1$ upon coincidence therebetween to produce an output serving as an actuating signal for a latch circuit $l_1$, the number of clock pulses counted by counter $CC_1$ is latched and stored in the latch circuit. Therefore, the digital output of latch circuit represents the set value of diaphragm aperture AV by variable resistor $RV_1$.

Responsive to the outputs of adder 9 and A/D converter 13, a second full adder 11 which may be of the same type as the first one 9 along with four exclusive OR gates 11-1 to 11-4 produces a digital output representation of an exposure value, in this instance, exposure time Tv based on the formula $Tv=Ev-Av$, as adder 11 and exclusive OR gates 11-1 to 11-4 constitute a full subtractor.

A shutter control circuit includes a binary coded decimal counter 14 such as SN 5442 available from TI Inc. having four inputs A, B, C and D connected to the respective output stages of adder 11, ten AND gates $A_0$ to $A_9$ connected at their one inputs through respective inverters to output stages 0 to 9 of counter 14 respectively and at their other inputs respectively to flip-flops F.F. 15 down to F.F. 6 constituting a binary counter 15 together with additional five flip-flops F.F. 1 to F.F. 5, the input of first flip-flop F.F. 1 being connected through an AND gate 16 to the clock pulse generator 2, and the AND gate 16 having a gating control input, b, connected to a point of connection between the constant voltage source Vc and a normally closed switch SW arranged to be opened when a front shutter curtain runs down to an aperture open position, and a switching transistor 17 with a base connected to all the outputs of AND gates $A_0$ to $A_9$ through a common OR gate OR, with a collector grounded and with an emitter connected to one end of a solenoid of electromagnet Mg, the opposite end of which is connected to the constant voltage source Vc, whereby when a number of clock pulse forming the total duration equal to the computed value of exposure time have been counted by counter 15, switching transistor 17 is rendered non-conducting to terminate energization of electromagnet Mg with simultaneous occurrence of the running down movement of a rear shutter curtain not shown.

The specific details of the circuitry of the illustrative embodiment of the present invention are set forth in the following discussion with reference to FIGS. 1 and 3, the latter being shown below:

| Output of Exposure Meter ($-\log_2 Tv$) | Binary Coded Input | | | | Equivalent Decimal Number | Shutter time Tv in sec. |
|---|---|---|---|---|---|---|
| | D | C | B | A | | |
| −4 | 0 | 0 | 0 | 0 | 0 | 15 |
| −3 | 0 | 0 | 0 | 1 | 1 | 8 |
| −2 | 0 | 0 | 1 | 0 | 2 | 4 |
| −1 | 0 | 0 | 1 | 1 | 3 | 2 |
| 0 | 0 | 1 | 0 | 0 | 4 | 1 |
| 1 | 0 | 1 | 0 | 1 | 5 | ½ |
| 2 | 0 | 1 | 1 | 0 | 6 | ¼ |
| 3 | 0 | 1 | 1 | 1 | 7 | ⅛ |
| 4 | 1 | 0 | 0 | 0 | 8 | 1/15 |
| 5 | 1 | 0 | 0 | 1 | 9 | 1/30 |

Now assuming that the logarithmic output of the exposure value computer at second adder 11 is set at minimum, namely, −4 to correspond to the contents of the four bit positions as determined to be (0000) according to the first line in the above truth table, then these binary 0-bit signals appearing at the respective inputs D, C, B and A of the binary coded decimal counter 14 are combined to form a coded signal of binary "0" level which is determined to locate at the first bit position, 0. in the counter 14 and which is used to indicate a number 15 with an added "second time unit" symbol directly to the right of the least significant digit, namely, 5, by an array of three numeral indicating tubes 21-1, 21-2 and 21-3 of the same type having seven segments, a, to, g, of light-emitting diode arranged generally in the form of a block number eight, as the selected combination of segments of each tube are energized by matrix circuits 18 with a transistorized driving circuit 19.

Connected between the binary coded decimal counter 14 and the matrix circuits 18 are eighteen AND gates $G_1$ to $G_{18}$ in such relation as: The first bit position of counter 14 is connected by way of a common lead and through a common inverter to all of one inputs of $G_1$, $G_2$ and $G_3$, the opposite inputs of which are connected to a 3-bit ring counter 20 such as SN7496 available from TI Inc. respectively at output bases of transistors $T_{10}$, $T_9$ and $T_8$ with emitters grounded and with collectors connected to indicators 21-1, 21-2 and 21-3, thus AND gates $G_3$, $G_2$ and $G_1$ are caused to produce outputs serially in the order named at a rate dependent upon the frequency of the clock pulse train applied to the "clock" input of ring counter 20 from the clock pulse generator 2, and numerical indicators 21-3, 21-2 and 21-1 are energized serially in the order named, or progressively farther right in synchronization with $G_3$, $G_2$ and $G_1$ respectively, with the resultant display being 15".

In this connection, it should be explained that the matrix circuits 18 responsive to the output of $G_3$ selects a combination of segments, f, and, e, in indicator 21-3 for energization through respective transistors 19-6 and 19-5 with bases connected through diodes in the matrix circuits 18 at output terminals F and E thereof to the output of $G_3$, and with emitters connected through resistors to the segments, f, and, e, while the remaining segments, a, b, c, d and g are unenergized which are connected to the emitters of transistors 19-1 to 19-4 and 19-8 with bases connected to the output terminals A to D and g of the matrix circuits 18. In a similar manner to the above, the FIG. 5 is displayed by the intermediate indicator 21-2 with segments, a, f, g, c and d energized as selected by the matrix circuits 18 in response to the output of $G_2$. Responsive to the output of $G_1$ occurring in synchronization with actuation of the rightmost indicator 21-1, the combination of a pair of upper-positioned side segments, f, and, b, horizontally parallel to each other is selected to be lit, thereby the symbol, ", whose use as the time second unit one is generally accepted in the electric clock art is made to appear in time sequence from the least significant digit of 5.

The exposure value Tv = −3 in the binary coded form of (0001) leads to the appearance of a decimal signal of binary "0" level only at the second bit position, 1. This signal is applied through an inverter to both of AND gates $G_5$ and $G_4$ at one inputs thereof, the opposite inputs of which are connected to the output stages 1 and 2 of ring counter 20 respectively. The outputs of $G_5$ and $G_4$ are applied to matrix circuits 18. Since a network for $G_5$ contains eight diodes distributed to actuate driving transistors 19-1 to 19-7 for energization of all the segments of indicator 21-3, and a network for $G_4$ contains two diodes distributed to actuate driving transistors 19-2 and 19-6 for energization of the pair of upper-positioned parallel side segments, f and b, of indicator 21-2, a sequential display of a digit of 8 with the symbol, ", standing just to the right of 8, totally, 8", is effected as shown in the truth table.

The exposure value Tv = −2 in the binary coded form of (0010) leads to the appearance of a decimal signal of binary "0" level only at the third bit position, 2. This signal is applied through an inverter to both of AND gates $G_7$ and $G_6$ at one inputs thereof, the opposite inputs of which are connected to the output stages 1 and 2 of ring counter 20 respectively. The outputs of $G_7$ and $G_6$ are applied to matrix circuits 18. Since a network for $G_7$ contains four diodes distributed to actuate driving transistors 19-2, 19-3, 19-6 and 19-7 for energization of the segments, b, c, f and g of indicator 21-3, and a network for $G_6$ contains two diodes distributed to actuate driving transistors 19-2 and 19-6 for energization of the pair of upper-positioned parallel side segments, f and b, of indicator 21-2, a sequential display of a digit of 4 and a symbol, ", totally, 4" is effected.

The exposure value Tv = −1 in the binary coded form of (0011) leads to the appearance of a decimal signal of binary "0" level only at the fourth bit position, 3. This signal is applied through an inverter to both of AND gates $G_9$ and $G_8$ at one inputs thereof, the opposite inputs of which are connected to the output stages 1 and 2 of ring counter 20 respectively. Since a network for $G_9$ contains five diodes distributed to actuate driving transistors 19-1, 19-2, 19-4, 19-5 and 19-7 for energization of segments a, b, g, e, and d of indicator 21-3, and a network for $G_8$ contains two diodes distributed in a similar manner to that shown in connection with $G_6$, a sequential display of a digit of 2 and a symbol, ", totally 2" is effected.

The exposure value Tv = 0 in the binary coded form of (0100) leads to the appearance of a decimal signal of binary "0" level only at the fifth bit position, 4. This signal is applied through an inverter to both of AND gates $G_{11}$ and $G_{10}$ at one inputs thereof, the opposite inputs of which are connected to the output stages 1 and 2 of ring counter 20 respectively. As a network for $G_9$ contains two diodes distributed to actuate driving transistors 19-2 and 19-3 for energization of segments f and e of indicator 21-3, and a network for $G_{10}$ contains two diodes distributed in a similar manner to that shown in connection with $G_8$, a sequential display of a digit of 1 and a symbol, ", totally 1" is effected.

To allow for the case where the derived value of shutter time is smaller than unit, there are provided similar additional networks to those for the above-mentioned numbers 2, 4, 8 and 15, but without that for the sumbol, in combination with AND gates $G_{12}$, $G_{13}$, $G_{14}$ and a pair of AND gates $G_{15}$ and $G_{16}$ respectively. Furthermore, to allow for a shutter time of 1/30 second, there is provided a network containing five diodes distributed to actuate driving transistors 19-1, 19-2, 19-3, 19-4 and 19-7 for energization of segments a, b, c, d and g of indicator 21-3 in response to the output of an AND gate $G_{18}$, and a network containing six diodes distributed to actuate driving transistors 19-1, 19-2, 19-3, 19-4, 19-5 and 19-6 for energization of segments, a, b, c, d, e and f of indicator 21-2.

After the photographer has recognized the digital display of the computed shutter time as acceptable, he or she will depress a "not shown" shutter button to open the switch SW in synchronization of the running down movement of the front shutter curtain in a manner well known in the art, thus the clock pulse train from generator 2 is passed through the AND gate 16 to the counter 15. Now assuming that the displayed shutter time is 1″, the one of the AND gates $A_0$ to $A_9$ which is connected to correspond to the binary coded decimal number 4, that is, AND gate $A_4$ is rendered effective to produce an actuating signal for the switching transistor 17 in response to the output of binary "1" level applied to the AND gate $A_4$ at the opposite input from the F.F. 11 of the counter 15. Since this output appears after the lapse of 1 second, the transistor 17 is turned off to de-energize the solenoid of electromagnet Mg, causing the shutter rear curtain to run down to the aperture fully closed position. Thus, the period of actuation of the shutter time determining means 17, Mg is adjusted to 1 second as displayed by the readout device 21.

It will be seen from the foregoing that the present invention contemplates the use of a time second unit indicating symbol which matches the common sense of a large public in discriminating numerical values of exposure time equal to and larger than unit from those smaller than unity without the necessity of using any symbol indicating readout element. Therefore, it is possible to avoid misreading of the scale in which the displayed number stands, and to give rise to advantages such as that of reducing the production cost which would otherwise result.

What is claimed is:

1. A shutter speed value displaying device for a camera comprising:
    (a) a shutter speed information signal forming circuit for producing a digital signal corresponding to a value of shutter speed;
    (b) shutter speed displaying means for displaying a numerical indication of a shutter speed value, said displaying means including a plurality of display elements for said numerical indication;
    (c) a decoder circuit connected to said signal forming circuit, said decoder circuit being provided with a plurality of output terminals which are arranged to produce an output signal from one of them in accordance with said digital signal, said arrangement of the output terminals of said decoder circuit consisting of output terminals which are divided into first and second groups of output terminals, said decoder circuit being arranged such that, when said digital signal corresponding to a shutter speed value corresponds to a shutter time shorter than a predetermined length of time, a specific output terminal in the first group of output terminals produces said output signal and, when said digital signal corresponds to a shutter time longer than said predetermined length of time, said output signal is produced from a specific output terminal in the second group of output terminals; and
    (d) a display signal forming circuit connected to the output terminals of said decoder circuit, said display signal forming circuit being arranged to form a display signal corresponding to a predetermined shutter speed value in response to the output signal from each output terminal of said decoder circuit and to transmit said display signal to said displaying means, said display signal forming circuit further being arranged to form a second mark signal for display in seconds in response to the output signal from said second group of output terminals and to transmit said second mark signal to a specific display element in said displaying means.

2. A shutter speed value displaying device for a camera comprising:
    (a) a shutter speed information signal forming circuit for producing a digital signal corresponding to a value of shutter speed;
    (b) shutter speed displaying means for displaying a numerical indication of a shutter speed value, said displaying means including a plurality of display elements for said numerical indication;
    (c) a decoder circuit connected to said signal forming circuit, said decoder circuit being provided with a plurality of output terminals which are arranged to produce an output signal from one of them in accordance with said digital signal, said arrangement of the output terminals of said decoder circuit consisting of output terminals which are divided into first and second groups of output terminals, said decoder circuit being arranged such that, when said digital signal corresponding to a shutter speed value corresponds to a shutter time shorter than a predetermined length of time, a specific output terminal in the first group of output terminals produces said output signal and, when said digital signal corresponds to a shutter time longer than said predetermined length of time, said output signal is produced from a specific output terminal in the second group of output terminals; and
    (d) a display signal forming circuit connected to said shutter speed displaying means and said decoder circuit, said display signal forming circuit including a plurality of display signal forming elements, each of which being arranged to form a display signal for displaying a given shutter time and to transmit said display signal to said displaying means to cause said displaying means to make a numerical display of a shutter time value, each of said elements being connected to a corresponding output terminal of said decoder circuit to form said display signal in response to the output signal from said corresponding output terminal of said decoder circuit and, among said elements, one of those connected to said second group of the output terminals being arranged to form a second mark signal for displaying an indication of seconds in response to an output signal of said second group of output terminals in addition to said display signal, said second mark signal being transmitted to a specific display element of said displaying means to cause it to display a second mark.

3. A shutter speed value displaying device for a camera comprising:
    (a) a shutter speed information signal forming circuit for producing a digital signal corresponding to a value of shutter speed;
    (b) a decoder circuit connected to said signal forming circuit, said decoder circuit being provided with a plurality of output terminals which are arranged to produce an output signal from one of them in accordance with said digital signal, said arrangement of the output terminals of said decoder circuit consisting of output terminals which are divided into first and second groups of output terminals, said decoder circuit being arranged such that, when said digital signal corresponding to a shutter speed value corresponds to a shutter time shorter than a predetermined length of time, a specific output terminal in the first group of output terminals produces said output signal and, when said digital signal corresponds to a shutter time longer than said predetermined length of time, said output signal is produced from a specific output terminal in the second group of output terminals;

(c) shutter speed display means for displaying a numerical indication of a shutter speed value, said displaying means including a plurality of display elements, each display element having a pair of upper-positioned side segment elements, a pair of lower-positioned side segment elements, a top segment element, an intermediate segment element and a bottom segment element; and (d) a display signal forming circuit connected to the output terminals of said decoder circuit, said display signal forming circuit being arranged to form a display signal corresponding to a given shutter speed value in accordance with the output signal of each of the output terminals of said decoder circuit and to transmit said display signal to said displaying means for a numerical display of said shutter speed value, said display signal forming circuit further being arranged to produce a signal for driving a pair of side segment elements of a predetermined display element of said display means in response to the output signal of said second group of output terminals.

* * * * *